United States Patent Office 3,019,117
Patented Jan. 30, 1962

3,019,117
REFRACTORY BLOCKS
Dominick Labino, Grand Rapids, Ohio, assignor, by mesne assignments, to Johns-Manville Fiber Glass Inc., Cleveland, Ohio, a corporation of Delaware
No Drawing. Filed Dec. 23, 1957, Ser. No. 704,297
5 Claims. (Cl. 106—66)

This invention relates to glass fiber products and more particularly to glass fiber refractory products and to methods of producing the same.

This application is a continuation-in-part of my co-pending application Serial No. 369,961, filed July 23, 1953, now abandoned.

This application is related to co-pending application Serial No. 302,627, filed August 4, 1952, and to co-pending application Serial No. 353,347, filed May 6, 1953, of Dominick Labino, each assigned to the same assignee as the present invention, now abandoned.

The above-mentioned applications refer respectively to a refractory material and to an insulation material in which glass fibers are impregnated with metallic oxides.

In those applications it is stated that if glass fibers are impregnated with a solution of a soluble metallic salt or compound which upon heating converts to a water insoluble metallic oxide, the product so formed attains refractory characteristics and further functions as an excellent radiation shield.

I have now found that if the impregnated fibers are compacted and heated sufficiently intensely to cause fusion of the impregnated glass fibers, for example a temperature in the approximate range of 2900 to 3500° F., there results, upon cooling, a brick-like material; thus the product may be a solid block which is impervious to gases and very resistant to high temperature—so resistant that it may be utilized as a furnace lining.

It is accordingly an object of this invention to describe a novel article of manufacture having superior refractory properties.

It is another object of this invention to describe a method of producing the novel article of manufacture.

These and other allied objectives of the invention are attained, broadly speaking, by heating oxide impregnated glass fibers in compact form above the fusion point of the impregnated glass to cause the impregnated fibers and oxide to become a solid mass.

In the practice of the invention glass fibers are first impregnated with a solution of a metallic salt; this is suitably accomplished by dipping the fibers into the solution to obtain complete saturation thereof. The saturated fibers are then compacted together and heated which first results in conversion of the salt to an oxide; this has the effect of raising the fusion point of the glass of the fibers above that at which the fibers would normally become molten. Thus, as an example, as described in my co-pending application Serial No. 302,627, filed August 4, 1952, fibers which of themselves due to their composition would soften at 900–1200° F. when impregnated and heated to dryness did not soften at temperatures of 2512° F.

However, if such impregnated fibers are intensely heated they do begin to fuse at a temperature somewhat in excess of 3000° F. and the flow results in a hard mass of glass fiber and metallic oxide; if compressed before heating the mass is rigid, impervious to gases and suitable for use as a furnace liner.

The chemical composition of the glass is not generally a critical factor, but I have found that those glasses which are alkali-free are most suitable. Suitable substantially alkali-free glass compositions comprise those identified as E glass and which are illustrated in U.S. Letters Patent No. 2,491,761.

The fibers most useful in the practice of the invention are a blown material having a fiber diameter in the range of 1.5 microns and below; fibers in the sub-micron range known commercially as AAA fibers having minimum, average and maximum diameters of 0.254, 0.508 and 0.762 micron respectively are eminently suitable while those between about 1.5 microns to 3 microns do not respond nearly as well possibly because as the fiber diameter increases they are less readily impregnated and do not retain the impregnant as well as the fibers of smaller diameter. The fine glass fibers employed then are in the form of a white readily compressible mass.

As the impregnant for the fibers cobalt nitrate is very effective and other useful polyvalent metal salts which decompose to heat stable oxides include the nitrates of chromium, nickel, iron and copper. Cobalt nitrate has been found to be most useful; it is converted to the oxide form with gentle heating, is as an oxide, extremely stable and highly adherent to the fibers. In general it is convenient to employ the impregnant in a concentration which approaches saturation in water solution.

The invention will be more fully understood by reference to the following detailed examples which are set forth by way of illustration only and not as a limitation on the inventive concept.

*Example I*

A mass of glass fibers is dipped into a substantially saturated solution of cobalt nitrate; when the mass is thoroughly saturated it is removed from the solution, and fired at 1600° F. to drive off the water and decompose the nitrate to the oxide. A firing time of about 15 minutes is ample at the temperature stated to accomplish the conversion to the oxide; the product of this firing is pliable, black in color and the oxide is highly adherent to the glass fiber and water insoluble thereon.

The mass of pliable metallic-oxide-impregnated fibers is then compressed and heated to a temperature in the range of 3300–3500° F. to cause fusion of the impregnated fibers. The resultant product when cooled is a light weight, gas-impervious rigid body.

*Example II*

Glass fibers, formed of "E" glass, and having average diameters of about 1.0 micron are dipped into a saturated aqueous solution of nickel nitrate for about 3 to 5 seconds. The fibers are then dried at a temperature in the range of 170 to 212° F. to remove the water of solution therefrom.

The fibers are then subjected to sufficient pressure to cause intimate compaction thereof into a block. The block of fibers is then heated to a temperature in the range from 3300 to 3500° F. to fuse the fibers and form a light weight, gas impervious block having extremely high temperature resistance.

*Example III*

Glass fibers, formed of "E" glass, and having average diameters of about 1.0 micron are dipped into a saturated aqueous solution of iron nitrate for about 3 to 5 seconds. The fibers are then dried at a temperature in the range of 170 to 212° F. to remove the water of solution therefrom.

The fibers are then subjected to sufficient pressure to cause intimate compaction thereof into a block. The block of fibers is then heated to a temperature in the range from 3300 to 3500° F. to fuse the fibers and form a light weight, gas impervious block having extremely high temperature resistance.

Example IV

Glass fibers, formed of "E" glass, and having average diameters of about 1.0 micron are dipped into a saturated aqueous solution of copper nitrate for about 3 to 5 seconds. The fibers are then dried at a temperature in the range of 170 to 212° F. to remove the water of solution therefrom.

The fibers are then subjected to sufficient pressure to cause intimate compaction thereof into a block. The block of fibers is then heated to a temperature in the range from 3300 to 3500° F. to fuse the fibers and form a light weight, gas impervious block having extremely high temperature resistance.

Example V

Glass fibers, formed of "E" glass, and having average diameters of about 1.0 micron are dipped into a saturated aqueous solution of chromium nitrate for about 3 to 5 seconds. The fibers are then dried at a temperature in the range of 170 to 212° F. to remove the water of solution therefrom.

The fibers are then subjected to sufficient pressure to cause intimate compaction thereof into a block. The block of fibers is then heated to a temperature in the range from 3300 to 3500° F. to fuse the fibers and form a light weight, gas impervious block having extremely high temperature resistance.

It will be understood that this invention is susceptible to modification in order to adopt it to different usages and conditions and accordingly, it is desired to comprehend such modifications within this invention as may fall within the scope of the appended claims.

I claim:

1. The method of producing a rigid, gas impervious refractory which comprises impregnating a mass of fine glass fiber with an aqueous solution wherein the solute is selected from the group consisting of cobalt nitrate, nickel nitrate, iron nitrate, chromium nitrate, and copper nitrate, heating and compacting the mass of impregnated glass fiber to remove the aqueous solvent and convert the solute to an oxide and to compress the mass of impregnated fiber into intimate contacting relation, fusing the compressed fiber and metal oxide into a gas impervious body by heating the compressed mass to a temperature within the approximate range of from 2900 to 3500° F., and cooling the fused mass to effect a rigid, solid refractory body.

2. The method of producing a rigid, gas impervious refractory which comprises impregnating a mass of fine glass fiber with an aqueous solution wherein the solute is selected from the group consisting of cobalt nitrate, nickel nitrate, iron nitrate, chromium nitrate, and copper nitrate, heating the impregnated mass to a temperature sufficient to remove the aqueous solvent and convert the solute to an oxide, compressing the mass of impregnated fiber into intimate contacting relation, fusing the compressed fiber and metal oxide into a gas impervious body by heating the compressed mass to a temperature within the approximate range of from 2900 to 3500° F., and cooling the fused mass to effect a rigid, solid refractory body.

3. The method of producing a rigid, gas impervious refractory which comprises impregnating a mass of fine glass fiber with an aqueous solution wherein the solute is selected from the group consisting of cobalt nitrate, nickel nitrate, iron nitrate, chromium nitrate, and copper nitrate, heating the impregnated mass to a temperature up to about 1600° F. to remove the aqueous solvent and convert the solute to an oxide, compressing the mass of impregnated fiber into intimate contacting relation, fusing the compressed fiber and metal oxide into a gas impervious body by heating the compressed mass to a temperature within the approximate range of from 2900 to 3500° F., and cooling the fused mass to effect a rigid, solid refractory body.

4. The method of producing a rigid, gas impervious refractory which comprises impregnating a mass of fine glass fiber with an aqueous solution wherein the solute is selected from the group consisting of cobalt nitrate, nickel nitrate, iron nitrate, chromium nitrate, and copper nitrate, heating the impregnated mass to a temperature of approximately 170 to 212° F. to remove the aqueous solvent, compressing the mass of impregnated fiber into intimate contacting relation, converting the solute to an oxide and fusing the compressed fiber and metal oxide into a gas impervious body by heating the compressed mass to temperatures within the approximate range of 2900 to 3500° F., and cooling the fused mass to effect a rigid, solid refractory body.

5. The method of producing a rigid, gas impervious refractory which comprises impregnating a mass of fine glass fiber with an aqueous solution wherein the solute is selected from the group consisting of cobalt nitrate, nickel nitrate, iron nitrate, chromium nitrate, and copper nitrate, heating the impregnated mass to a temperature up to about 1600° F. to remove the aqueous solvent and convert the solute to an oxide, compressing the mass of impregnated fiber into intimate contacting relation, fusing the compressed fiber and metal oxide into a gas impervious body by heating the compressed mass to a temperature within the approximate range of from 3300 to 3500° F., and cooling the fused mass to effect a rigid, solid refractory body.

References Cited in the file of this patent

UNITED STATES PATENTS

| | | |
|---|---|---|
| 2,584,763 | Waggoner | Feb. 5, 1952 |
| 2,610,957 | Steinman et al. | Sept. 16, 1952 |
| 2,699,415 | Nachtman | Jan. 11, 1955 |
| 2,762,168 | McCutchen | Sept. 11, 1956 |